United States Patent [19]

Hayashi

[11] Patent Number: 5,430,582
[45] Date of Patent: Jul. 4, 1995

[54] DIGITAL SIGNAL REPRODUCING APPARATUS

[75] Inventor: Hideki Hayashi, Tsurugashima, Japan

[73] Assignee: Pioneer Electronic Corporation, Tokyo, Japan

[21] Appl. No.: 187,479

[22] Filed: Jan. 28, 1994

[30] Foreign Application Priority Data

Feb. 1, 1993 [JP] Japan .................. 5-015000

[51] Int. Cl.⁶ .................................. G11B 5/09
[52] U.S. Cl. .............................. 360/51; 360/46
[58] Field of Search ............... 360/51, 53, 46, 32, 360/65; 375/114, 116, 119, 120

[56] References Cited

U.S. PATENT DOCUMENTS

| | | | |
|---|---|---|---|
| 4,819,103 | 4/1989 | Okamura | 360/51 |
| 4,906,941 | 3/1990 | Kato et al. | 375/120 X |
| 5,233,482 | 8/1993 | Galbraith et al. | 360/32 X |
| 5,233,632 | 8/1993 | Baum et al. | 375/116 X |
| 5,247,401 | 9/1993 | Umemoto et al. | 360/51 X |
| 5,267,267 | 11/1993 | Kazawa et al. | 375/116 X |

*Primary Examiner*—Donald Hajec
*Assistant Examiner*—Thien Minh Le
*Attorney, Agent, or Firm*—Sughrue, Mion, Zinn, Macpeak & Seas

[57] ABSTRACT

Disclosed is a digital signal reproducing apparatus, which detects a zone in which sample values, obtained by sampling a read signal, continuously increase or continuously decrease over a predetermined time, and compensates the phase of a sampling clock based on a sample value obtained at a middle point in this detection zone. This structure ensures reproduction of a digital signal with the sampling clock whose phase is synchronized with the center of the amplitude of the read signal even in a reproducing apparatus which employs a partial response system in which a read signal is a multivalue signal that will take three values, five values, etc.

3 Claims, 5 Drawing Sheets

FIG. 4

| A1 | A2 | A3 | r | s |
|---|---|---|---|---|
| 0 | 0 | 0 | | |
| 0 | 0 | 1 | | |
| 0 | 0 | 2 | 0 | 0 |
| 0 | 1 | 0 | | |
| 0 | 1 | 1 | | |
| 0 | 1 | 2 | 1 | 1 |
| 0 | 2 | 0 | | |
| ≀ | ≀ | ≀ | 0 | 0 |
| 2 | 0 | 2 | | |
| 2 | 1 | 0 | 1 | 0 |
| 2 | 1 | 1 | | |
| ≀ | ≀ | ≀ | 0 | 0 |
| 2 | 2 | 2 | | |

NORMAL

CLOCK PHASE LEAD

CLOCK PHASE LAG

NORMAL

CLOCK PHASE LEAD

CLOCK PHASE LAG

DIGITAL SIGNAL REPRODUCING APPARATUS

BACKGROUND OF THE INVENTION

1. Field of the Invention

The present invention relates to an apparatus for reproducing a digital signal recorded on a recording medium.

2. Description of the Related Art

There is known a digital signal reproducing apparatus which compares the level of a signal read from a recording medium with a predetermined slice level, and reproduces digital data of "1" and "0" with this predetermined slice level taken as a threshold value.

FIG. 1 shows the structure of this digital signal reproducing apparatus, and FIG. 2 illustrates one example of the operation of that structure.

First, a read signal (a) read from a recording medium is supplied to a comparator 1. The comparator 1 compares the level of the read signal (a) with a slice level (b). When the level of the read signal (a) is equal to or higher than the slice level (b), the comparator 1 supplies a binary signal (c) of a high level "1" to a determining circuit 2 and a clock generator 3. When the level of the read signal (a) is lower than the slice level (b), the comparator 1 supplies a binary signal (c) of a low level "0" to the determining circuit 2 and the clock generator 3. The clock generator 3 generates a clock (d) whose phase is in synchronous with the edge timing of this binary signal (c). The determining circuit 2 samples the binary signal (c), supplied from the comparator 1, at the timing of the clock (d) from the clock generator 3, yielding a digital data output (e).

As apparent from the above, the digital signal reproducing apparatus is designed in such a way that the phase of the sampling clock matches with the cross point between the read signal and the predetermined slice level. Thus, the phase of the sampling clock synchronizes with the timing of the middle point in the level transition at the time the read signal changes its level from "1" to "0" or from "0" to "1", i.e., with the timing at which the level of the read signal becomes the center level of the maximum amplitude the read signal itself has. It is therefore possible to sample the read signal at the accurate timing.

In a reproducing apparatus that employs a partial response system in which the read signal is a multi-value signal that will take three values, five values, etc., the read signal does not vary near the center level of the maximum amplitude and becomes a flat waveform in some case. In such a case, however, the read signal and the predetermined slice level would have a number of cross points, so that the phase of the sampling clock cannot be compensated accurately.

SUMMARY OF THE INVENTION

It is therefore an object of the present invention to provide a digital signal reproducing apparatus, which will ensure compensation for the phase of the sampling clock even in a partial response system in which a read signal is a multi-value signal that will take three values, five values, etc.

The digital signal reproducing apparatus embodying the present invention for reproducing a digital signal from a read signal from a recording medium on which a digital signal is recorded, comprising an A/D converter for sequentially sampling the read signal at a timing of a sampling clock to convert the read signal into digital sample values; detecting means for detecting a zone in which the sample values continuously increase or continuously decrease over a predetermined time; phase-error signal generating means for generating a phase-error signal having a level corresponding to a level of a sample value obtained at a middle point in a detection zone of the detecting means; and clock generating means for generating a clock whose phase is compensated based on the level of the phase-error signal, as the sampling clock.

The digital signal reproducing apparatus of this invention detects a zone in which sample values, obtained by sampling a read signal, continuously increase or continuously decrease over a predetermined time, and compensates the phase of a sampling clock based on a sample value obtained at a middle point in this detection zone.

BRIEF DESCRIPTION OF THE DRAWINGS

FIG. 4 is a diagram showing a truth table of a pattern detection gate circuit G1;

DETAILED DESCRIPTION OF THE PREFERRED EMBODIMENT

A preferred embodiment of the present invention will now be described.

Figure 1:
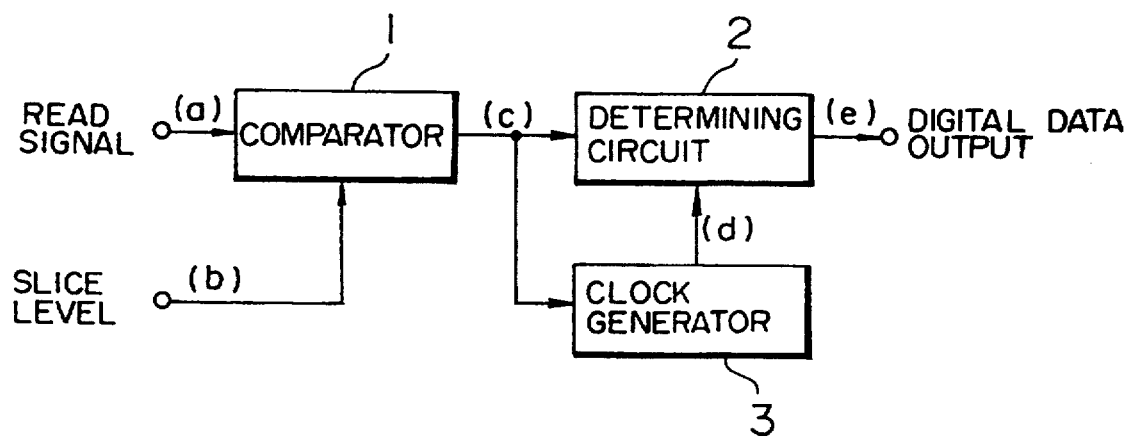
FIG. 1 is a diagram showing the structure of a digital signal reproducing apparatus.
Figure 2:
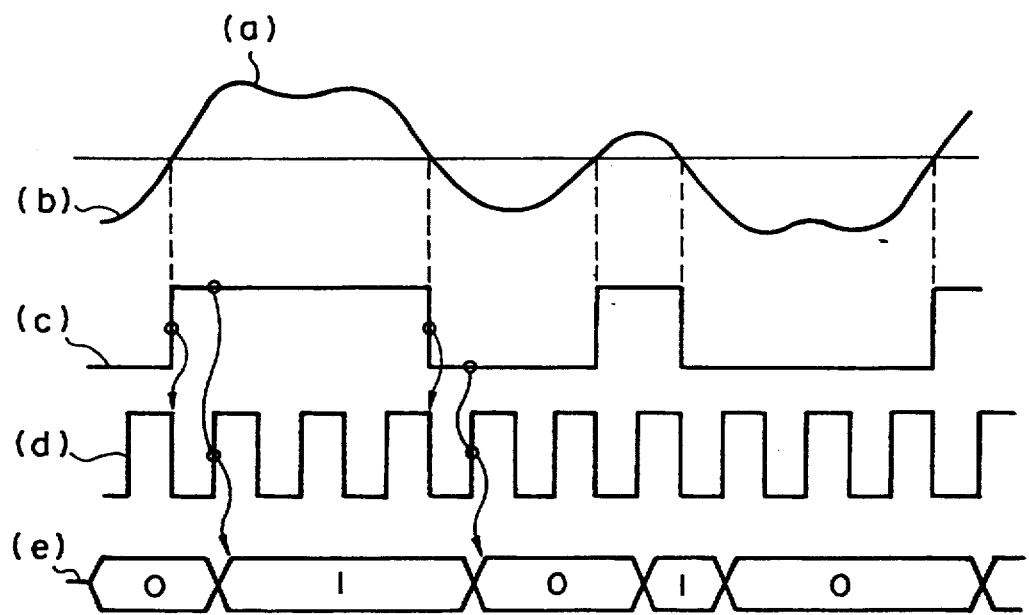
FIG. 2 is a diagram showing the operation of the digital signal reproducing apparatus.
Figure 3:
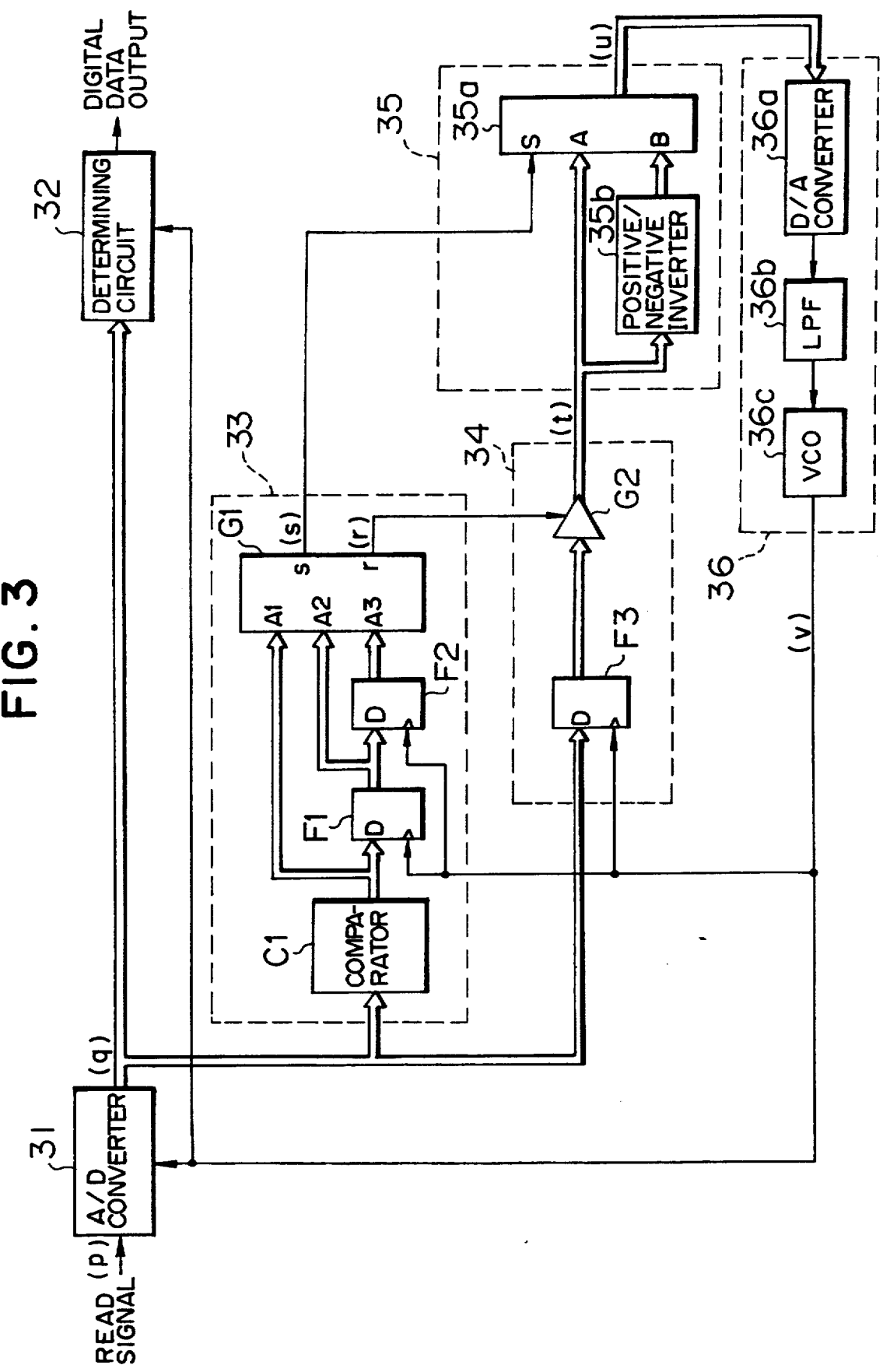
FIG. 3 is a diagram showing the structure of a digital signal reproducing apparatus embodying the present invention.

FIG. 3 shows the structure of a digital signal reproducing apparatus embodying this invention.

In the diagram, an A/D converter 31 samples a received read signal (p) at the timing of a sampling clock (v) supplied from a clock generator 36, yielding digital sample values (q), and sends the sample values (q) to a determining circuit 32, a pattern detector 33 and level detector 34. The determining circuit 32 estimates the original digital data signal from the sequential relationship of the sample values (q), and sets the estimated signal as a digital data output (e). The determining circuit 32 is constituted of, for example, a Viterbi decoder, etc., and selects data with a lower error from the sequential relationship of the received sample values (q) as the digital data output (e), using a predetermined algorithm. The pattern detector 33 sends a detection flag (r) of logic "1" to the level detector 34 when detecting a data sequence pattern, which continuously increases or decreases, from the received sample values (q). Further, the pattern detector 33 sends a decision flag (s) of logic "0" to a polarity switching circuit 35 when detecting a data sequence pattern, which continuously increases from the received sample values (q), and sends a decision flag (s) of logic "1" to the polarity switching circuit 35 when detecting a data sequence pattern which continuously decreases. The level detector 34 passes only that of the sample values (q), received from the A/D converter 31, which is supplied when the detection flag (r) has logic "1", and sends it as a sample level signal (t) to the polarity switching circuit 35. The polarity switching circuit 35 sends the received sample level signal (t) directly as a phase-error signal (u) to the clock generator 36 when the decision flag (s) is "0", and sends a signal which is the received sample level signal (t) whose polarity is inverted, as the phase-error signal (u), when the decision flag (s) is "1". The clock generator 36 generates a sampling clock (v) whose phase has been compensated with the phase-error signal (u), and sends the clock to the A/D converter 31, the determining circuit 32, the pattern detector 33 and the level detector 34.

The internal structure of the pattern detector 33 will be described below.

A comparator C1 converts the supplied sample value (q) to three values "0", "1" and "2", for example, with two threshold values x0 and x1, and sends the resultant three-value signal to a flip-flop F1 and an A1 terminal of a pattern detection gate circuit G1. The flip-flop F1 fetches the supplied three-value signal at the timing of the sampling clock (v), and supplies it to a flip-flop F2 and the A2 terminal of the pattern detection gate circuit G1. The flip-flop F2 fetches the three-value signal, supplied from the flip-flop 1, at the timing of the sampling clock (v), and supplies it to the A3 terminal of the pattern detection gate circuit G1.

With the above structure, three-value signals converted from the three sample values (q), consecutively supplied from the A/D converter 31, are respectively supplied to the A1, A2 and A3 terminals of the pattern detection gate circuit G1. The pattern detection gate circuit G1 is a gate circuit designed based on a truth table as shown in, for example, FIG. 4, and outputs the detection flag (r) of logic "1" when the three-value signal pattern of "0, 1, 2" or "2, 1, 0" is respectively supplied to the A1, A2 and A3 terminal. The pattern detection gate circuit G1 outputs the decision flag (s) of logic "1" when the three-value signal pattern "0, 1, 2" is respectively supplied to the A1, A2 and A3 terminals. In other words, the pattern detector 33 always monitors the three-value signal converted from the consecutively-supplied three sample values (q), outputs the detection flag (r) of logic "1" when detecting a data sequence of "2, 1, 0" which indicates a continuous increase as the three-value signal, or a data sequence of "0, 1, 2" which indicates a continuous decrease as the three-value signal, and further outputs the decision flag (s) of logic "1" when the data sequence is "0, 1, 2" indicating the continuous decrease.

The internal structure of the level detector 34 will now be described.

A flip-flop F3 fetches the supplied sample value (q) at the timing of the sampling clock (v), and sends it to a gate circuit G2. The gate circuit G2 passes the sample value (q), supplied from the flip-flop F3, only when the detection flag (r) has a logic "1" and outputs it as a sample level signal (t).

As the pattern detector 33 and level detector 34 are designed in the above manner, the zone where the sample values (q) continuously increase or continuously decrease over a predetermined time (corresponding to three sampling clocks in the above-described embodiment) is detected, and a sample values obtained at the middle point in the detected zone is output as a sample level signal (t).

The internal structure of the polarity switching circuit 35 will be described below.

The sample level signal (t), supplied from the level detector 34, is supplied to the A terminal of a multiplexer 35a and a positive/negative inverter 35b. The positive/negative inverter 35b supplies a signal, which is the received sample level signal (t) whose polarity (negative/positive) is inverted, to the B terminal of the multiplexer 35a. The multiplexer 35a selects the signal supplied at its A terminal and outputs it as the phase-error signal (u), when the decision flag (s), supplied to the S terminal, is "0". When the decision flag (s) is "1", the multiplexer 35a selects the signal supplied at its B terminal and outputs it as the phase-error signal (u). In other words, when the decision flag (s) is "0", the sample level signal (t) supplied from the level detector 34 is output directly as the phase-error signal (u), and when the decision flag (s) is "1", a signal which is the sample level signal (t) whose polarity is inverted, is output as the phase-error signal (u).

The structure of the clock generator 36 will be described below.

A D/A converter 36a converts the phase-error signal (u), supplied from the polarity switching circuit 35, into an analog voltage, and supplies the analog voltage to a low-pass filter 36b. The low-pass filter 36b averages the received analog voltage and supplies the averaged voltage to a VCO 36c. The VCO 36c generates a sampling clock (v) which has an oscillation frequency corresponding to the averaged analog voltage supplied from the low-pass filter 36b. The clock generator 36 with this structure generates a sampling clock (v) whose phase is compensated in accordance with the phase-error signal (u).

The operation of the digital signal reproducing apparatus embodying this invention shown in FIG. 3 will be described referring to the operational chart of FIG. 5.

Figure 5:
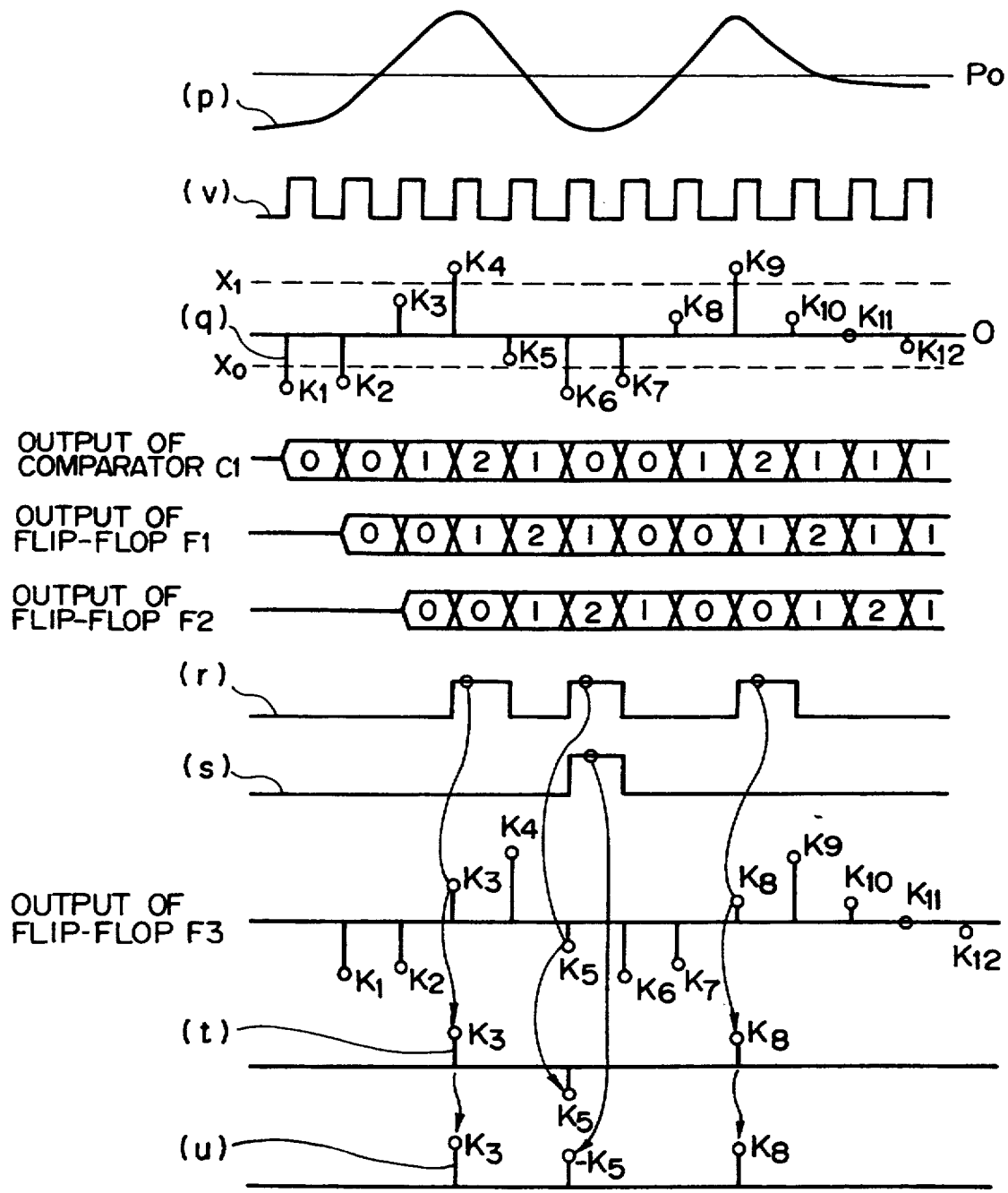
FIG. 5 is a diagram showing the operation of the digital signal reproducing apparatus embodying the present invention.

The reference numerals in FIG. 5 indicate the output signals of the individual sections of the digital signal reproducing apparatus of this invention shown in FIG. 3; the same reference numerals as used in FIG. 3 are also given to the same signals in FIG. 5.

In the diagrams, a read signal (p) which fluctuates around the level "Po", is supplied to the A/D converter 31. The A/D converter 31 fetches the received read signal (p) at the timing of the sampling clock (v), converts the read signal (p) to digital sample values as indicated by K1 to K12, and outputs the sample values (q). The comparator C1 of the pattern detector 33 outputs a three-value signal of "0" when the supplied sample value (q) is smaller than the threshold value x0, outputs a three-value signal of "1" when the supplied sample value (q) is equal to or greater than the threshold value x0 and smaller than the threshold value x1, and outputs a three-value signal of "2" when the supplied sample value (q) is equal to or greater than the threshold value x1. The flip-flops F1 and F2 output the three-value signal supplied from the comparator C1, while shifting this signal at the timing of the sampling clock (v).

The pattern detection gate circuit G1 outputs the detection flag (r) of logic "1" when the outputs of the comparator C1, flip-flops F1 and F2 become "2, 1, 0" or "0, 1, 2". The pattern detection gate circuit G1 outputs the decision flag (s) of logic "1" when the outputs of the comparator C1, flip-flops F1 and F2 become "0, 1, 2". The flip-flop F3 delays the sample values (q) as indicated by K1 to K12, supplied from the A/D converter 31, by one sampling clock, and sends the delayed sample values to the gate circuit G2. The gate circuit G2 outputs only the sample values K3, K5 and K8 among K1 to K12, at the points where the detection flag (r) of logic "1" is supplied, as the sample level signal (t). The polarity switching circuit 35 inverts the polarity of only the sample value K5 among K3, K5 and K8 at the point where the decision flag (s) of logic "1" is supplied, and outputs the resultant sample value as the phase-error signal (u). The clock generator 36 compensates the phase of the sampling clock (v) with the phase-error signal (u).

As described above, a continuous increase or continuous decrease in sample values (q) over a period of three sampling clocks is detected by the structure which comprises the pattern detector 33, level detector 34 and polarity switching circuit 35, and of those sample values in this period, that sample value which is obtained at the timing of the second one of the three clocks, i.e., obtained at the middle point in the period of the three clocks, is output as the phase-error signal (u).

Figure 6A:
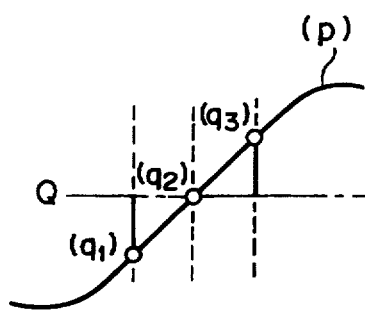
FIGS. 6A through 6F are diagrams showing an operation for compensating the phase of a clock according to this invention.
Figure 6B:
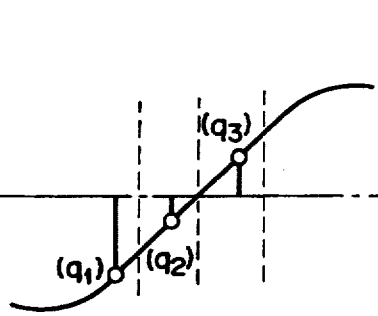
Figure 6C:
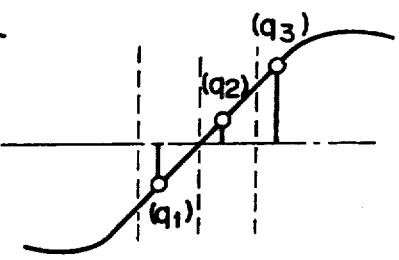
Figure 6D:
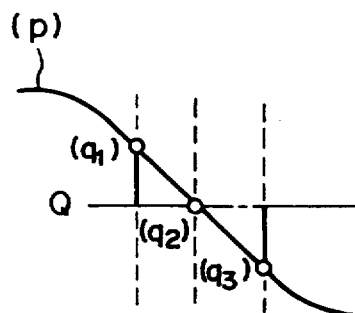
Figure 6E:
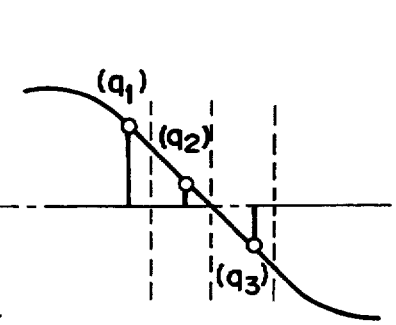
Figure 6F:
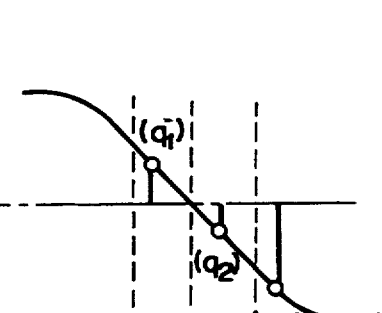

A description will now be given of the operation for compensating the phase of the sampling clock (v) with the phase-error signal (u), with respect to FIGS. 6A to 6F. FIGS. 6A through 6C show sample values (q1), (q2) and (q3) obtained by the A/D converter 31 when the read signal (p) tends to continuously increase, and FIGS. 6D through 6F show sample values (q1), (q2) and (q3) obtained by the A/D converter 31 when the read signal (p) tends to continuously decrease.

At this time, since the read signal (p) shows a continuous increase in FIGS. 6A through 6C, the sample value (q2) among those sample values which is obtained at the center point, is supplied as the phase-error signal (u) to the clock generator 36. Since the read signal (p) shows a continuous decrease in FIGS. 6D through 6F, the polarity of the sample value (q2) among those sample values which is obtained at the center point, is inverted and the resultant signal is supplied as the phase-error signal (u) to the clock generator 36. In the diagrams, the broken lines indicate the timing positions of the sampling clock (v) from the clock generator 36 when its phase is normal. The alternate long and short dash line in the diagrams indicate the center level Q of the sample values, and the operation for compensating the phase of the sampling clock (v) is performed in accordance with the difference between the level Q and the level of the phase-error signal (u).

First, as the sample values (q1), (q2) and (q3) are sampled at the normal timing in FIG. 6A, the level of the sample value (q2) becomes equal to the predetermined level Q indicated by the alternate long and short dash line. Accordingly, this predetermined level Q is supplied as the phase-error signal (u) to the clock generator 36. Thus, the clock generator 36 generates the sampling clock (v) with the current phase.

Next, as the sample values (q1), (q2) and (q3) are sampled at a later timing than the normal timing in FIG. 6B, the level of the sample value (q2) becomes smaller than the predetermined level Q indicated by the alternate long and short dash line. Accordingly, a value smaller than this predetermined level Q by the sample value (q2) is supplied as the phase-error signal (u) to the clock generator 36. Thus, the clock generator 36 generates the sampling clock (v) whose phase is delayed by the amount corresponding to the sample value (q2), thereby compensating for phase leading of the clock.

Then, as the sample values (q1), (q2) and (q3) are sampled at a later timing than the normal timing in FIG. 6C, the level of the sample value (q2) becomes greater than the predetermined level Q indicated by the alternate long and short dash line. Accordingly, a value greater than this predetermined level Q by the sample value (q2) is supplied as the phase-error signal (u) to the clock generator 36. Thus, the clock generator 36 generates the sampling clock (v) whose phase is led by the amount corresponding to the sample value (q2), thereby compensating for phase lag of the clock.

Then, as the sample values (q1), (q2) and (q3) are sampled at the normal timing in FIG. 6D, the level of the sample value (q2) becomes equal to the predetermined level Q indicated by the alternate long and short dash line. Accordingly, this predetermined level Q is supplied as the phase-error signal (u) to the clock generator 36. Thus, the clock generator 36 generates the sampling clock (v) with the current phase.

Next, as the sample values (q1), (q2) and (q3) are sampled at an earlier timing than the normal timing in FIG. 6E, the level of the sample value (q2) becomes larger than the predetermined level Q indicated by the alternate long and short dash line. As the sample values (q1), (q2) and (q3) indicate a continuous decrease, a signal which is this sample value (q2) whose polarity is inverted is supplied as the phase-error signal (u) to the clock generator 36. Accordingly, a value smaller than this predetermined level Q by the sample value (q2) is supplied as the phase-error signal (u) to the clock generator 36. At this time, therefore, the clock generator 36 generates the sampling clock (v) whose phase is delayed by the amount corresponding to the sample value (q2), thereby compensating for phase leading of the clock.

Next, as the sample values (q1), (q2) and (q3) are sampled at an earlier timing than the normal timing in FIG. 6F, the level of the sample value (q2) becomes smaller than the predetermined level Q indicated by the alternate long and short dash line. As the sample values (q1), (q2) and (q3) indicate a continuous decrease, a signal which is this sample value (q2) whose polarity is inverted is supplied as the phase-error signal (u) to the clock generator 36. Accordingly, a value greater than this predetermined level Q by the sample value (q2) is supplied as the phase-error signal (u) to the clock generator 36. At this time, therefore, the clock generator 36 generates the sampling clock (v) whose phase is led by the amount corresponding to the sample value (q2), thereby compensating for phase lag of the clock.

Although the foregoing description of this embodiment has been given with reference to the case where three-value signals are recorded on a recording medium, the recording signals are not limited to this three-value type. For instance, if a five-value signal which has a value pattern of "−2, −1, 0, 1, 2" is recorded on the recording medium, the comparator C1 of the pattern detector 33 determines a five-value signal from the sample values (q). Further, for such a five-value signal, the pattern detector 33 is designed to detect a data sequence pattern of "−2, −1, 0", "−1, 0, 1" and "0, 1, 2" indicating a continuous increase, and a data sequence pattern of "2, 1, 0", "1, 0, −1" and "0, −1, −2" indicating a continuous decrease.

As described above, the digital signal reproducing apparatus embodying this invention is designed to detect a zone in which sample values, obtained by sampling a read signal, continuously increase or continuously decrease over a predetermined time, and compensate the phase of a sampling clock based on a sample value obtained at a middle point in this detection zone.

This structure ensures reproduction of a digital signal with the sampling clock whose phase is synchronized with the center of the amplitude of the read signal even in a reproducing apparatus which employs a partial response system in which a read signal is a multi-value signal that will take three values, five values, etc.

What is claimed is:

1. A digital signal reproducing apparatus for reproducing a digital signal from a read signal from a recording medium on which a digital signal is recorded, comprising:

an A/D convertor for sequentially sampling said read signal at a timing of a sampling clock to convert said read signal into digital sample values;

a detecting circuit which uses multiple threshold values for detecting a zone in which said sample values continuously increase or continuously decrease over a predetermined time;

a phase-error signal generating circuit for generating a phase-error signal having a level corresponding to a level of a sample value obtained at a middle point in a detection zone of said detecting circuit; and a clock generating circuit for generating a clock whose phase is compensated based on said level of said phase-error signal, as said sampling clock.

2. The digital signal reproducing apparatus according to claim 1, wherein said detecting circuit detects if three or five consecutive sample values in said sample values continuously increase or continuously decrease.

3. The digital signal reproducing apparatus according to claim 1, wherein said phase-error signal generating circuit generates a phase-error signal having a level corresponding to a level of a sample value obtained at a middle point in said continuously-increasing zone of said sample values when said continuously-increasing zone is detected by said detecting circuit, and generates a phase-error signal having a level corresponding to a level of that sample value, obtained at a middle point in said continuously-decreasing zone of said sample values, whose polarity is inverted, when said continuously-decreasing zone is detected by said detecting circuit.

* * * * *